United States Patent
Chang

[15] 3,655,261
[45] Apr. 11, 1972

[54] DEFLECTION OF ELECTROMAGNETIC BEAMS FROM GUIDES BY ACOUSTICAL SURFACE WAVES

[72] Inventor: William Shen Chie Chang, University City, Mo.

[73] Assignee: Bell Telephone Laboratories, Incorporated, Murray Hill, Berkeley Heights, N.J.

[22] Filed: Mar. 2, 1970

[21] Appl. No.: 15,575

[52] U.S. Cl. ........................... 350/96 WG, 350/161
[51] Int. Cl. ............................ G02b 5/14, G02f 1/34
[58] Field of Search ............................. 350/96, 161

[56] References Cited

UNITED STATES PATENTS

| | | | |
|---|---|---|---|
| 3,539,244 | 11/1970 | Marks | 350/161 |
| 3,498,693 | 3/1970 | Fein et al. | 350/161 |
| 3,499,705 | 3/1970 | Baynham et al. | 350/96 WG |
| 3,516,731 | 6/1970 | Whinnery | 350/161 |
| 3,406,358 | 10/1968 | Seidel et al. | 350/96 |
| 3,568,102 | 3/1971 | Tseng | 350/161 |
| 3,560,724 | 2/1971 | Condell, Jr. | 350/96 WG |

OTHER PUBLICATIONS

Manufacturing Optics International, Vol. 22, No. 3, 9/69, p. 170

*Primary Examiner*—Ronald L. Wibert
*Assistant Examiner*—Jeff Rothenberg
*Attorney*—R. J. Guenther and Arthur J. Torsiglieri

[57] ABSTRACT

The acousto-optical deflection apparatus disclosed employs acoustical surface waves, typically propagating anti-parallel to a guided optical beam to deflect the beam out of the guide. In a preferred embodiment, the optical beam is deflected into a transparent substrate from which it is extracted for utilization.

1 Claim, 1 Drawing Figure

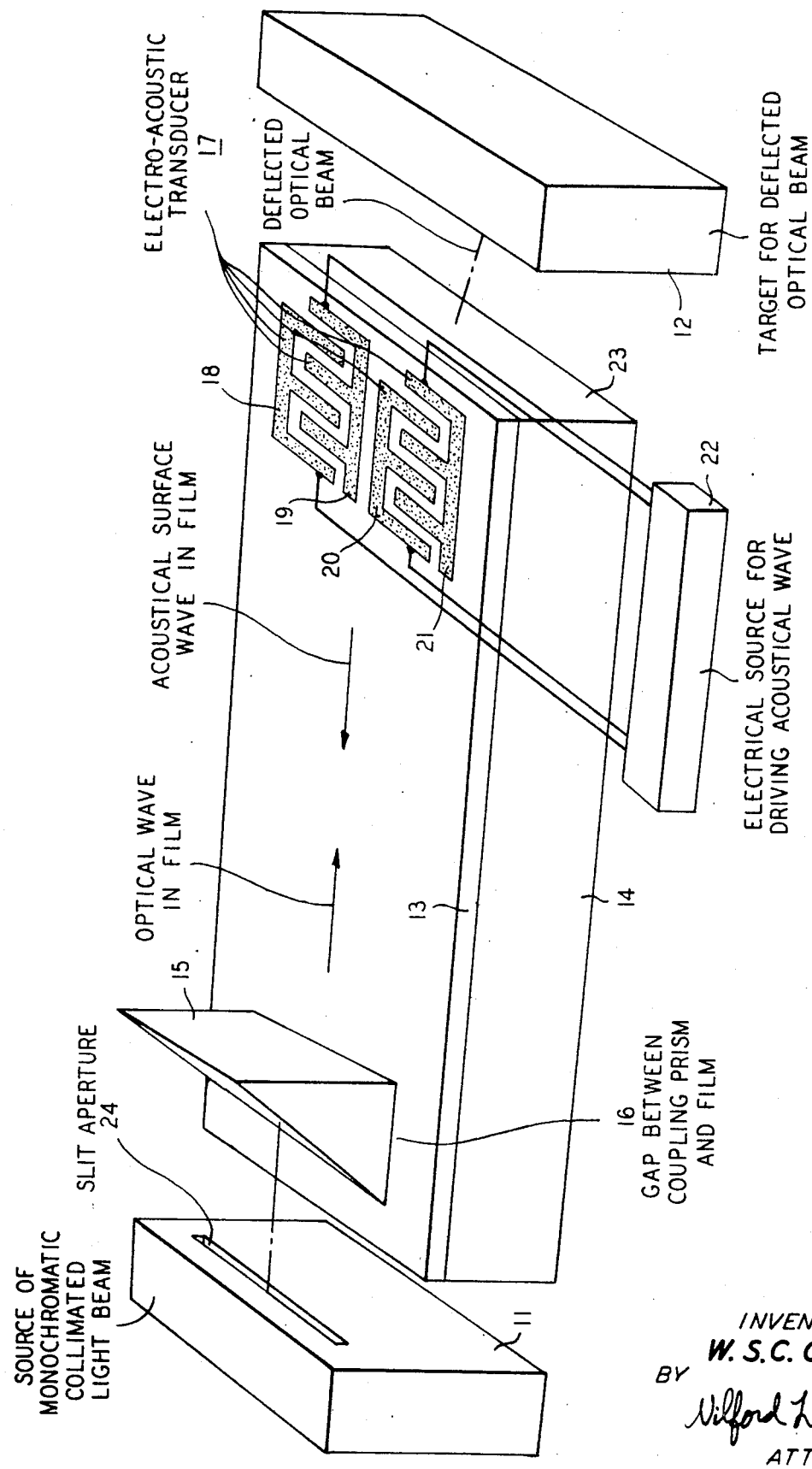

DEFLECTION OF ELECTROMAGNETIC BEAMS FROM GUIDES BY ACOUSTICAL SURFACE WAVES

BACKGROUND OF THE INVENTION

This invention relates to acousto-optical deflectors, particularly those employing guided optical waves.

A variety of prior acousto-optical deflectors employing bulk optically transparent bodies are known. The differences among these prior deflectors all relate to attempts to obtain more efficient deflection in one manner or another or to increase the frequency bandwidth of the deflector, for example, by fanning out the acoustical wave so that Bragg's condition of diffraction is satisfied for each frequency on some portion of the curved acoustical wave front. Attempts to achieve more efficient deflection by concentrating the optical beam in one or more dimensions are limited in effectiveness because of the need to have coextensive volumes of the acoustical and optical waves in their region of intersection and by the requirement that, to promote efficiency of deflection, Bragg's condition of diffraction should be satisfied for all angles of deflection within that coextensive volume in which the beams interact.

For reasons such as these, it has recently been proposed to deflect an optical beam in a guiding thin film so that the deflection occurs within the plane of the film. The concentration of both the acoustical energy and the optical energy near the region of the film tends to promote greater efficiency. See one such proposal in the copending application of P. K. Tien, Ser. No. 860,383, filed Sept. 23, 1969, and assigned to the assignee hereof. Further, it has been experimentally demonstrated recently that acoustical and optical guided waves can be generated in a dielectric slab or film with high efficiency, for example, as described in the article by P. K. Tien, R. Ulrich, and R. J. Martin, Applied Physics Letters, Volume 14, No. 9, pp. 291–294, May, 1969.

Nevertheless, the deflector proposed in the Tien apparatus is somewhat restricted in its usefulness in that it still must be employed with a separate mechanism or technique for coupling the deflected beam from the thin film and in the respect that the angles of deflection are still smaller than are desirable for many applications.

SUMMARY OF THE INVENTION

According to my invention, a guided electromagnetic wave is deflected out of the guide by a surface acoustical wave propagating in an appropriate direction with respect to the guided electromagnetic wave.

According to a specific feature of my invention, the acoustical wave is propagated in a direction substantially aligned with the axis of propagation of the electromagnetic wave in the transparent material of the guide. Illustratively, the waves propagate in opposite directions (anti-parallel).

According to another specific feature of my invention, the thin film is disposed on an optically transparent substrate of lower index of refraction and the acoustical surface wave and electromagnetic beam are propagated in modes in the guiding thin film having relative propagation constants to favor the deflection of the electromagnetic beam into the substrate, from which it can be extracted for utilization.

A variety of advantages are obtained with a deflection apparatus according to my invention. They include more efficient deflection for a given acoustical power and elimination of the need for either a phased array of acoustical transducers or a focused acoustical beam transducer, as typically desired when deflection takes place in the plane of the film. Further advantages include more stable thermal properties and more efficient thermal conduction because of the dimensions of the material in which the beams are guided. The thermal properties imply that high repetition rates of deflection can be achieved.

BRIEF DESCRIPTION OF THE DRAWING

Further features and advantages of my invention may be appreciated from the following detailed description, taken together with the drawing, in which the sole FIGURE is a partially pictorial and partially block diagrammatic illustration of a preferred embodiment of the invention.

DESCRIPTION OF ILLUSTRATIVE EMBODIMENT

In the embodiment of the drawing it is desired to deflect a monochromatic collimated light beam supplied from a source 11 so that it will strike selected spots or lines on a target 12 or other apparatus utilizing a deflected optical beam. The deflection is accomplished in the optical quality thin film 13 disposed on the substrate 14 of lower refractive index and characterized by a thickness of the order of the wavelength of the supplied optical beam.

The optical beam is coupled into the thin film 13 by a coupling prism 15 separated from thin film 13 by a small gap 16 between prism 15 and film 13. This coupling technique is that described in the copending patent application of P. K. Tien, Ser. No. 793,696, filed Jan. 24, 1969.

There are also supplied means for launching the acoustical surface wave in thin film 13, illustratively to propagate antiparallel to and coaxial with the optical beam in thin film 13. The acoustical launching means includes the interlocking comb-type electro-acoustic transducer 17 including the comb-type elements 18, 19, 20, and 21, which are arranged to provide an acoustical surface wave of selected width in thin film 13. The number of transducer elements are merely selected for convenience in establishing the width of the acoustical surface wave; this width is typically selected to be at least as broad as that of the guided optical wave coupled into film 13. The elements 18 through 21 of transducer 17 are coupled to an electrical source 22 adapted for driving the acoustical wave transducer 17 to generate the acoustical surface wave in thin film 13.

The foregoing arrangement of components employs parameters favoring deflection of the optical beam into the substrate 14 by the interaction; and, therefore, target 12 is disposed to receive the deflected optical beam as it propagates through the end of surface 23 of substrate 14.

The source 11 is illustratively a helium-neon laser operating in the $TE_3$ mode at 6,328 A units. The beam from source 11 is illustratively supplied through a slit-type aperture 24 so that a relatively broad thin beam may be coupled into thin film 13 by coupling prism 15.

The material of thin film 13 is illustratively zinc oxide of high purity and high optical quality, although it could also be zinc sulphide and have substantially similar properties, as specified immediately below. The thickness of thin film 13 is illustratively $w_1=6,250$ A units. It is about 20 millimeters wide and 20 millimeters long.

The substrate 14 is illustratively crystalline quartz of high optical quality and substantial thickness. The coupling prism 15 is illustratively rutile ($TiO_2$) and is separated by thin film 13 by a gap of about 1,000 A units.

The electro-acoustic transducer is a gold film of about 500 A to 3,000 A thickness of the known interlocking comb type, as described in the article "Analysis of the Excitation and Detection of Piezoelectric Surface Waves in Quartz by Means of Surface Electrodes," G. A. Coquin et al., Journal of the Acoustical Society of America, 41, 921 (1967). The gold film is placed on zinc oxide film 13. The electrical source 22 is a source operating at 200 megahertz in order to provide an acoustical surface wavelength in thin film 13 of approximately 10 microns. Illustratively, the frequency of source 22 may be varied from about 180 megahertz to about 220 megahertz to provide variation in the angle of deflection of the extracted optical beam as it propagates toward target 12.

It should be noted that, provided the thickness of thin film 13 does not vary more than 200 A either way from the nominal thickness given above, the parameters described above provide deflection of some guided optical mode into the substrate by the acoustical surface wave, both for a supplied optical wavelength of 6,328 A units and for an alternative supplied optical wavelength of 10,640 A units (1.06 microns). The latter wavelength may be supplied from a neodymium-ion laser employing an yttrium-aluminum-garnet host or any of the several glass hosts known in the art. Still other wavelengths of light may be employed if the thickness of the film and/or the sound wavelength are changed to maintain the same sort of relative propagation constants of the modes.

Alternative optical quality thin films 13 which appear attractive are gallium arsenide, various types of high quality optical glass, Irtran II® slab-like crystals, as supplied by Kodak, and many others. Those specifically named are very attractive for use at 1.06 microns.

In the operation of the embodiment of the drawing, the 6,328 A optical beam from source 11, in a ribbon-like form, is refracted within prism 15 to strike the lower surface thereof in proximity to thin film 13. The evanescent field of the wave at the lower surface is then coupled to a phase-matched guided optical wave of the same frequency so that a major portion of the supplied optical energy "tunnels" through the gap 16 and is launched as a guided mode in thin film 13. This mode is guided in the sense of being substantially restricted in its energy distribution by the upper and lower major surfaces of thin film 13, the lower one of which forms the interface with substrate 14.

The optical mode propagating in thin film 13 is not guided with respect to its lateral dimensions and will tend to spread so that it is even broader at a point midway between prism 15 and transducer 17.

Between prism 15 and transducer 17, the optical wave is exposed to an acoustical surface wave launched by transducer 17 with a wavelength in the material of thin film 13 that is approximately 10 microns at the surface for a supplied frequency from source 22 of about 200 megahertz.

T sufficiently high acoustical intensity, the interaction of the guided optical wave and the guided acoustical wave produces an acousto-optic effect which may be analyzed as if a moving grating of increased and reduced refractive indices existed in the thin film 13. While the acousto-optic effect for light waves propagating within the plane of such a grating has never been analyzed heretofore and is thus not intuitively obvious, my analysis shows that the propagating light is diffracted by this grating effect as it propagates through the same volume of material as the acoustical wave. A substantial portion of the guided optical energy, up to 50 percent, is deflected out of the guide through the lower surface of thin film 13 into substrate 14.

In substrate 14 the deflected optical wave continues to propagate downward at an angle with respect to the interface of film 13 and substrate 14 determined by and directly related to, the acoustical driving frequency. The deflected optical wave emerges through end surface 23, with an increase of the deflection angle due to refraction, and is incident upon the target 12, which may illustratively be an ordinary projection screen.

For the interaction involved in the operation of the embodiment of FIG. 1, the component $\beta_s'$ of the phase propagation constant of the diffracted light in the plane of the film must be equal to the sum or difference of the phase propagation constants of the guided light and of the acoustical surface wave. Thus, the following is Equation (1):

$$\beta_s' = \beta_o \pm \beta_a \quad (1)$$

where $\beta_s'$ is the component of the phase propagation of the diffracted, or scattered, light in the plane of the film; $\beta_o$ is the phase propagation of the guided light in thin film 13; and $\beta_a$ is the phase propagation constant of the acoustical surface wave. These phase propagation constants are $2\pi/\lambda$ times the appropriate index of refraction, to be defined hereinafter.

Further, in order for the light to be deflected out of the guide 13, the component $\beta_s'$ of the diffracted light in the plane of the thin film must be less than its propagation constant, $2\pi n_{14}/\lambda$ of the adjacent material of substrate 14 into which it emerges, as measured at the frequency of the diffracted light. From Equation (1), $\beta_s'$ can be made small enough for the deflection only when the acoustic frequency is large enough, e.g., more than about 180 megahertz in FIG. 1.

It will be seen that the parameters of the illustrative embodiment of FIG. 1 and the direction and wavelength of the acoustical surface wave favor deflection into the substrate 14 as opposed to the air above thin film 13 because the substrate 14 has a higher index of refraction than the air, so that $\beta_s'$ may more easily be made less than its corresponding propagation constant in the substrate 14 than it could be made less than its corresponding propagation constant in the air. Nevertheless, parameters could be chosen to deflect beams out of film 13 both into substrate 14 and into the air above. Also, this condition is easily achieved for a symmetrical disposition of the lower index materials on either major surface of guide 13.

A further consideration relevant to the operation of the embodiment of FIG. 1 is that, for practical acoustic transducers, the ratio of the light wavelength in thin film 13 to the wavelength of the acoustical wave will be much less than unity. In the embodiment of FIG. 1 this ratio is about 0.06 for a 200 megahertz acoustic wave. Further, for the TE$_3$ mode of the optical wave at 6,328 A in thin film 13, the phase propagation constant $\beta_o$ of the guided optical wave is approximately equal to $2\pi/\lambda$ times the sum 0.03 plus the bulk index of refraction of the material of the film 13. Here, 0.03 plus the bulk index is the effective index of refraction of thin film 13 for the specified mode. For tolerances of ±200 A units on the 6,250 A thickness of the zinc oxide thin film 13, there are usable guided modes for both 6,328 A wavelength supplied light from source 11 or 1.06 microns supplied light from source 11, both wavelengths being free space wavelengths.

A mathematical analysis of the operation of the embodiment of the drawing is as follows. It is assumed that both the optical and acoustical waves have no variation in the plane of the film transverse to the direction of propagation and they are both propagating along the same axis which we will call the z axis in opposite, or anti-parallel, directions. Further, the acoustic surface wave is approximated by a periodic change of dielectric constant (independent of vertical position within the thin film 13) along the z-axis and is assumed to be zero outside of thin film 13. The latter approximation is a rough approximation.

For the demonstration purpose, we shall consider the incident wave to be of the anti-symmetric discrete modes and the scattered waves to be the continuous radiating plane wave modes. The orthonormal anti-symmetric guided discrete modes can be described by $$\underline{E}_m = E_m(x, z, \omega, t)\underline{i}_y$$

$$E_m(x, z, \omega, t) = \begin{cases} A_m^{(0)} \sin \kappa_m x e^{-j(\beta_m z - \omega t)} & |x| \leq d \\ A_m^{(0)} \sin \kappa_m d e^{-\gamma_m(x-d)} e^{-j(\beta_m z - \omega t)} & x > d \end{cases} \quad (2)$$

$$\kappa_m = \sqrt{n^2 k^2 - \beta_m^2}, \quad \gamma_m = \sqrt{\beta_m^2 - k^2}, \quad k = \frac{2\pi}{\lambda_0}$$

$\beta_m$ is the mth root of the equation $$\tan(\sqrt{n^2 k^2 - \beta_m^2}\, d) = -\sqrt{n^2 k^2 - \beta_m^2}/\sqrt{\beta_m^2 - k^2}$$

$$\underline{H}_m = \left(-\frac{j}{\omega\mu}\frac{\partial E_m}{\partial y}\right)\underline{i}_x + \left(\frac{j}{\omega\mu}\frac{\partial E_m}{\partial x}\right)\underline{i}_z$$

$$\frac{\beta_m}{\omega\mu}\int_0^\infty E_m E_n^* dx = \delta_{mn}$$

The orthonormal anti-symmetric continuous modes (i.e., radiating plane waves) can be described by $$\underline{E}(\xi; x, z, \omega, t) = E(\xi; x, z, \omega, t)\underline{i}_y \quad (3)$$

$$E(\xi; x, z, \omega, t) = \begin{cases} B_{(\xi)}{}^{(0)} \sin \sigma x e^{-j(\beta z - \omega t)} & |x| \leq d \\ [C_{(\xi)}{}^{(0)} e^{j\xi x} + C_{(\xi)}{}^{(0)*} e^{-j\xi x}] e^{-j(\beta z - \omega t)} & x > d \end{cases}$$

$$C_{(\xi)}{}^{(0)} = \frac{1}{2} B_{(\xi)}{}^{(0)} e^{-j\xi d} (\sin \sigma d - j\frac{\sigma}{\xi} \cos \sigma d)$$

$$\sigma = \sqrt{n^2 k^2 - \beta^2}, \quad \xi = \sqrt{k^2 - \beta^2}$$

$$\frac{\beta}{\omega\mu} \int_0^\infty E(\xi) E^*(\xi') dx = \delta(\xi - \xi')$$

$$\frac{\beta}{\omega\mu} \int_0^\infty E(\xi) E_m{}^* dx = 0$$

The dielectric constant of the medium with acoustic excitation is described by
$$\epsilon = n^2[1 + \delta \cos(Kz - \Omega t)] \quad \text{for } |x| \leq d \quad (4)$$
where $\Omega$ is the acoustic angular frequency, $\Omega = 2\pi f$.
$$|K| = 2\pi/\Lambda = 2\pi f/v = \Omega/v$$
$K$ can be positive or negative depending upon whether the acoustic wave is propagating in the $+z$ or the $-z$ direction.

The steady-state Maxwell's equation for a time varying $\epsilon$ given in Equation (4) leads to a wave equation $$\frac{n^2}{c^2}\underline{\ddot{E}} - \nabla^2 \underline{E} = -\frac{n^2}{c^2} \delta \cos(Kz - \Omega t)\underline{\ddot{E}} \quad \text{for } x \leq d$$
$$\frac{1}{c^2}\underline{\ddot{E}} - \nabla^2 \underline{E} = 0 \quad \text{for } x > d \quad (5)$$

where the terms containing time derivative w.r.t. $\cos(Kz - \Omega t)$ is neglected because we typically have $\Omega/\omega \approx 10^8/10^{14} \approx 10^{-6}$.

Equation (5) is solved by perturbation techniques. To be specific we shall assume $$\underline{E} = E_y \underline{i}_y$$

$$E_y = V E_n(\omega_0) + \sum_{m \neq 0} V_m(z) E_m(x, z, \omega_s, t)$$

$$+ \int_0^\infty g(\xi, z) E(\xi; x, z, \omega_s, t) d\xi \quad (6)$$

where $V$ is the amplitude of incident wave, $\omega_0$ is the angular frequency of the incident wave, $V_m$ is the amplitude of the scattered discrete guided modes, $g(\xi, z)$ is the amplitude of the scattered continuous radiating modes, and $\omega_s$ is the angular frequency of the scattered wave. We are interested in calculating the amplitude of the scattered continuous wave for a given amplitude of the incident wave. Therefore, we substitute (6) into (5), multiply both sides of the resultant equation by $(\beta'/\omega_s\mu) E^*(\xi', x, z, \omega_s, t)$, integrate w.r.t. $x$ from $x=0$ to $x=\infty$, and obtain $$2j\beta' \frac{\partial g(\xi', z)}{\partial z} - \frac{\partial^2 g(\xi', z)}{\partial z^2}$$

$$\equiv n^2 k^2 \delta V \cos(Kz - \Omega t) \cdot \frac{\beta'}{\omega_s \mu} \int_0^d E^*(\xi'; x, z, \omega_s, t) E_n dx \quad (7)$$

where the change in $V$ as function of $z$ is neglected in this preliminary analysis. It implies that our calculation is only a perturbation analysis and that the results need to be modified for high efficiency scattering situations. Note that $$\cos(Kz - \Omega t) \int_0^d E^*(\xi'; x, z, \omega_s, t) E_n(x, z, \omega_0, t) dx$$

has a $z$ and $t$ variation of the form $$e^{-j\beta_n z} e^{+j\beta' z} e^{j\omega_0 t} e^{-j\omega_s t} [e^{jKz} e^{-j\Omega t} + e^{-jKz} e^{+j\Omega t}],$$

While the homogeneous solution of Equation (7) is of the form
$$E + Fe^{2j\beta' z}.$$

Thus the amplitude of the scattered wave in the inhomogeneous Equation (7) will be large when (a) $\omega_0 - \omega_s + \Omega = 0$ and $\begin{cases} -\beta_n + \beta' - K = 0 & \text{for large } E \text{ values} \\ -\beta_n + \beta' - K = 2\beta' & \text{for large } F \text{ values} \end{cases}$ or (b) $\omega_0 - \omega_s - \Omega = 0$ and $\begin{cases} -\beta_n + \beta' + K = 0 & \text{for large } E \text{ values} \\ -\beta_n + \beta' + K = 2\beta' & \text{for large } F \text{ values} \end{cases}$ For acoustic wave propagating in the $+z$ direction, $K$ is positive and condition (a) is unrealizable because $\beta_n \geq k \geq \beta$ for guided wave to exist. Similarly, for acoustic wave propagating in the $-z$ direction, $K$ is negative and condition (b) is unrealizable. In short, for acoustic waves propagating in the same direction as $E_n$ we need $\omega_s = \omega_0 - \Omega$, $\beta' = \pm(\beta_n - K)$ (8a)
For acoustic waves propagating against $E_n$, we need
$$\omega_s = \omega_0 + \omega, \quad \beta' = \pm(\beta_n - |K|) \quad (8b)$$
Equation (8) expresses simply the phase matching condition along the slab as we should expect to happen. The negative $\beta'$ value signifies that an "equal-amplitude" scattered wave in the $-z$ direction will always be present simultaneously with a scattered wave in the $+z$ direction.

To evaluate the number of resolvable spots in such a deflector, let us consider the case
$$\omega_s = \omega_0 + \Omega$$
$$\beta' = \beta_n - |K| + \Delta\beta'$$
Then only the magnitude of $E$ will be significant and $E$ will be a slow varying function $z$. Moreover, $\partial^2 g/\partial z^2 = 0$ and $$2j\beta' \frac{\partial E}{\partial z} = \frac{1}{2} n^2 k^2 \delta V e^{j\Delta\beta' z} q.$$

If we assume the acousto-optical interaction takes place only from $z=0$ to $z=L$, $$\frac{E^* E(\xi')}{V^2} = \left( n^2 \cdot \frac{\pi^2}{\beta' \lambda} \cdot \frac{L}{\lambda} \cdot \delta \cdot q \right)^2 \frac{\sin^2(\Delta\beta' L/2)}{(\Delta\beta' L/2)^2} \quad (9)$$

where $$q = \frac{\beta'}{\omega\mu} \int_0^d A_n{}^{(0)} B_{(\xi')}{}^{(0)} \sin \kappa_n x \sin \sigma' x dx.$$

Equation (9) implies that $E^* E$ will drop to zero when $\Delta\beta' L = \pm \pi$. But,
$$\beta' = k \cos \theta$$
$$(d\beta'/d\theta) = -(2\pi/\lambda) \sin \theta.$$
Thus,
$$\text{radiation beam width} = \Delta\phi = \frac{2\pi}{L} \Big/ \left(\frac{2\pi}{\lambda} \sin \theta\right)$$
$$= \frac{\lambda}{L \sin \theta} \quad (10)$$

On the other hand, if we let the scan of radiation direction for the acoustic frequency to change from $f_1$ to $f_2$ be $\delta\theta$, then
$$k \cos \theta_1 - k \cos(\theta_1 + \Delta\theta) = (\beta_n - |K_1|) - (\beta_n - |K_2|)$$
$$= +(2\pi/v)\delta f.$$
Thus
$$\Delta\theta = (2\pi \delta f)/(vk \sin \theta), \quad (11)$$
and we obtain the number of resolvable spots to be
$$N = \Delta\theta/\Delta\phi = \Delta f \cdot L/v = \Delta f \cdot \tau = \text{bandwidth} \times \text{transit time} \quad (12)$$
This is the familiar speed-bandwidth relationship which exists for all bulk acousto-optical deflectors. We have shown that the same relationship exists for thin film deflectors.

To evaluate the efficiency of thin film acousto-optical deflectors we note that, for the scattered wave propagating in the +z direction alone, $$E_{rad,y} = \int_0^k E(\xi', z) E(\xi'; x, z, \omega_s, t) d\xi'$$

$$P_{rad} = \frac{1}{2} \int_{-x}^{-x} (-E_y H_x^*) dx = \int_0^k E(\xi', z) E^*(\xi', z) d\xi'$$

or, $$P_{rad}/V^2 \cong \left(n^2 \cdot \frac{\pi^2}{\beta'\lambda} \cdot \frac{L}{\lambda} \cdot \delta \cdot q\right)^2 \int_0^k \frac{\sin^2\left(\frac{\Delta\beta L}{2}\right)}{\left(\frac{\Delta\beta L}{2}\right)^2} d\xi$$

$$\cong \left(n^2 \cdot \frac{\pi^2}{\beta'\lambda} \cdot \frac{L}{\lambda} \cdot \delta \cdot q\right)^2 \sin\theta \cdot \frac{2\pi}{L} \text{ for } \theta \neq 0, \frac{\pi}{2}$$

It is usual to relate $\Delta n$ to acoustic power approximately by the relationship $$\frac{\Delta n}{n} = \frac{1}{2} n^3 p\bar{s}, \quad P_a = \frac{1}{2} \rho v^3 |\bar{s}|^2 (2bd)$$

where $\bar{s}$ is the strain and $b$ is the width of the acoustic beam in the thin film. In other words, with acoustic excitations $$n = n_0 + \Delta n$$
$$n^2 \approx n^2_0 + 2n_0\Delta n = n^2_0 + n^5{}_0 p\bar{s} = n^2_0 + \delta n^2_0$$
$$\therefore n^2\delta = n_0{}^3 p\bar{s}, \quad (n^2\delta)^2 = \frac{n^6 p^2}{\rho v^3} \cdot \frac{P_a}{bd}$$

Thus, $$\frac{P_{rad}}{V^2} = \frac{\pi^2}{2\cos^2\theta} \frac{M_2}{\lambda^2} \frac{\pi \cot\theta L q^2}{db} P_a \text{ for } \theta \neq 0, \theta \neq \frac{\pi}{2} \quad (13)$$

where $$M_2 = \left(\frac{n^6 p^2}{\rho v^3}\right).$$

We see that the efficiency improves over that of the bulk acousto-optical deflectors by the factor of $(\pi \cot\theta L q^2/db)/(W_0/H)$.

Various modifications of the invention should be apparent to those skilled in the art. For example, the acoustical surface wave might be propagated in the same direction as the guided optical wave.

Also, efficient deflection may still be achieved for substantial departures from collinearity of the optical and acoustical waves, inasmuch as the deflection is not critically affected throughout a substantial range of angles between them.

For still more efficient utilization of the optical energy guided in thin film 13, it becomes desirable to use both the forward-propagating and backward-propagating components of the guided optical energy.

Further, as mentioned above, there may be advantages to symmetrical beam deflections, that is, through both major surfaces of thin film 13, as preferably provided by providing equal refractive indices of the dielectric media bounding each major surface of film 13. The indices of these media would be lower than that of film 13.

Still further, a great variety of optically transparent materials may be used for thin film 13 and substrate 14.

In these cases it is preferable that the index of refraction of substrate 14 be somewhat less than that of thin film 13 but close enough that deflection of the light out of the film may be achieved with practical acoustical frequencies. It should also be clear that the range of deflection angles depends on the usable range of acoustical frequencies. For the foregoing example, this range of frequencies is about 40 megahertz.

I claim:

1. Apparatus for deflecting a beam of optical electromagnetic wave energy comprising
   a first optically transparent body forming a substrate for a second optically transparent body of higher refractive index than said first body,
   said second optically transparent body having two substantially parallel major surfaces separated by a distance of the order of the optical wavelength of the electromagnetic beam to be deflected, one of said surfaces forming an interface with said first body,
   means for launching said electromagnetic beam into said second body along an axis in a guided mode therein,
   means for launching an acoustical surface wave in said second body localized near the other of said surfaces thereof and propagating substantially aligned with the axis of said beam, said acoustical wave launching means including a source of an electrical driving signal of frequency variable through a selected range,
   said electromagnetic beam and said acoustical surface wave being propagated in modes in said second body having phase propagation constants related according to
   $$\beta_s' = \beta_o \pm \beta_a$$
   where $\beta_s'$, $\beta_o$, and $\beta_a$ are the phase propagation constants for the deflected electromagnetic beam, the guided electromagnetic beam and the acoustical surface wave, respectively, in said second body, and
   the phase propagation constant of said deflected electromagnetic beam $\beta_s'$ in said second body being less than the phase propagation constant of said deflected beam in said first body,
   a portion of said beam being deflected from said guided mode in said second body into a single mode propagating out of said second body through said interface into said first body at an angle with respect to said interface substantially directly related to the frequency of said electrical driving signal.

* * * * *